(12) United States Patent
Villines

(10) Patent No.: US 9,038,254 B1
(45) Date of Patent: May 26, 2015

(54) UNLOADING APPARATUS

(71) Applicant: Benjamin K. Villines, Weatherford, OK (US)

(72) Inventor: Benjamin K. Villines, Weatherford, OK (US)

( * ) Notice: Subject to any disclaimer, the term of this patent is extended or adjusted under 35 U.S.C. 154(b) by 384 days.

(21) Appl. No.: 13/645,775

(22) Filed: Oct. 5, 2012

(51) Int. Cl.
  *B23Q 1/44* (2006.01)
  *B25B 27/00* (2006.01)
  *B25B 27/06* (2006.01)

(52) U.S. Cl.
  CPC .......... *B25B 27/0007* (2013.01); *B25B 27/062* (2013.01)

(58) Field of Classification Search
  CPC   B25B 27/0007; B25B 27/062; B25B 27/023; B23P 19/04
  USPC ............ 29/255, 238, 239, 244, 252, 278, 270
  See application file for complete search history.

(56) References Cited

U.S. PATENT DOCUMENTS

| | | | |
|---|---|---|---|
| 5,761,785 A * | 6/1998 | Connolly | 29/249 |
| 6,109,602 A * | 8/2000 | Schron et al. | 269/216 |
| 6,321,432 B1 * | 11/2001 | Przybyla | 29/213.1 |
| 6,330,737 B1 * | 12/2001 | Lowemark | 29/214 |
| 6,393,683 B1 * | 5/2002 | Howard | 29/235 |
| 6,993,816 B2 * | 2/2006 | Greenhill | 29/229 |
| 7,048,266 B2 * | 5/2006 | Starr | 269/25 |
| 7,908,723 B1 * | 3/2011 | Kodi | 29/243.56 |
| 8,151,425 B2 * | 4/2012 | Cossart | 29/281.1 |

* cited by examiner

*Primary Examiner* — Lee D Wilson
(74) *Attorney, Agent, or Firm* — Gary Peterson

(57) ABSTRACT

An apparatus for unloading a stuffing box is formed from a resiliently deformable material. It features a base and a plurality of elongate finger elements. The finger elements are supported about the periphery of the base, and define outer boundaries of a hollow interior region. Each finger element supports an externally projecting lip. In the relaxed position of the apparatus, the lips project outside the cross-sectional profile of the base. In a compressed configuration, the lips are fully contained within the base's cross-sectional profile. When the apparatus is inserted into a stuffing box loaded with coaxially aligned annular packing elements, it assumes a compressed configuration until the lips clear the lowermost packing element to be removed. The apparatus then assumes a relaxed position with the lips engaging the underside of the lowermost packing element. The apparatus and the engaged packing elements are then withdrawn from the stuffing box.

17 Claims, 7 Drawing Sheets

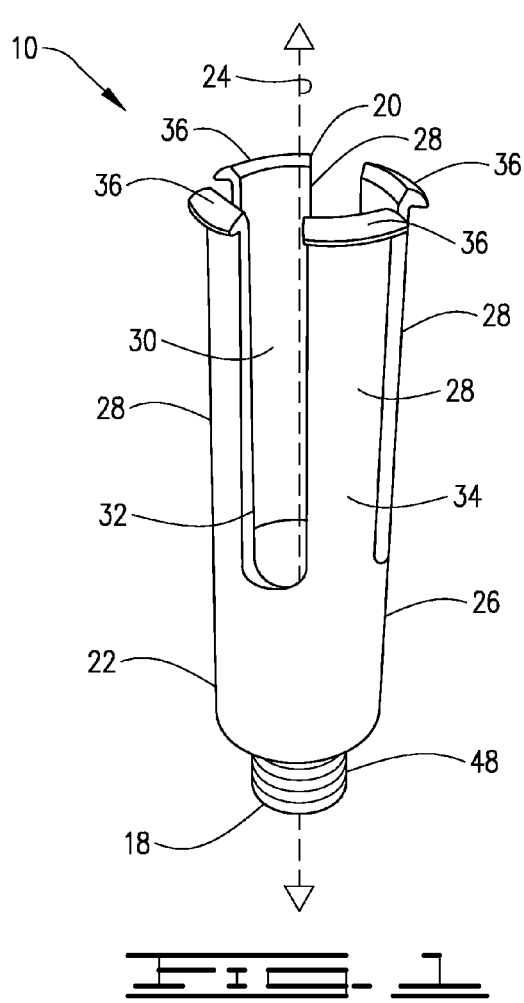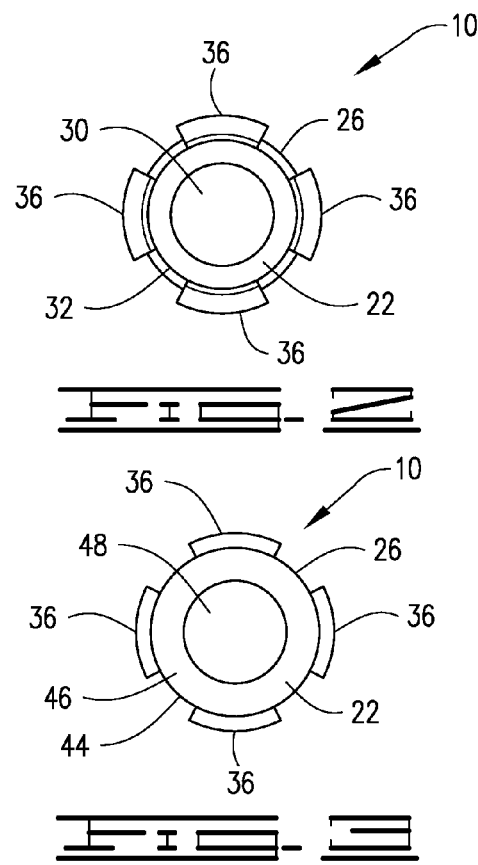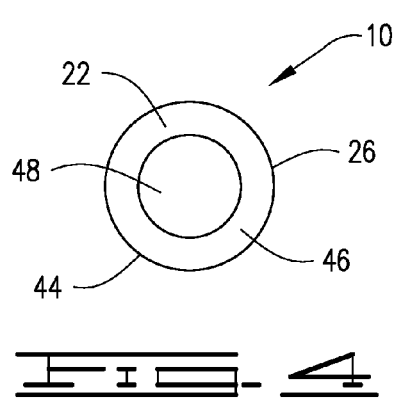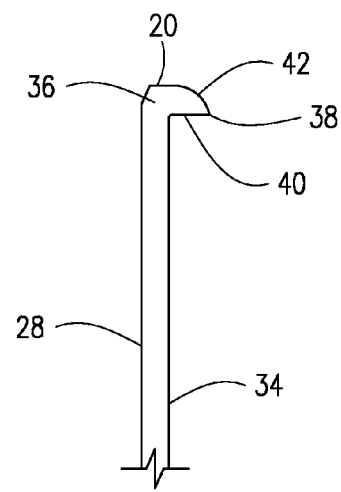

UNLOADING APPARATUS

SUMMARY OF THE INVENTION

An apparatus for unloading a stuffing box features a first end and an opposed second end. The apparatus is formed from a base and a plurality of elongate finger elements. The base is situated at or adjacent the first end. The finger elements are supported by the base and disposed about its periphery, and define the outer boundaries of a hollow interior region. Each finger element supports an externally projecting lip at or adjacent the second end.

BRIEF DESCRIPTION OF THE DRAWINGS

FIG. 1 is a perspective view of an unloading apparatus.

FIG. 5 is an enlarged side elevation view of one of the finger elements of the unloading apparatus shown in FIG. 1.

FIG. 6 shows a portion of a pump having a stuffing box. The stuffing box is shown in cross-section.

FIG. 7 shows the pump of FIG. 6, after the first and second rods of the rod assembly have been separated. Each of the rods has been retracted in order to provide access to the stuffing box.

FIG. 8 is an enlarged cross-sectional view of the stuffing box of the pump shown in FIGS. 6 and 7 at a later stage of the unloading process. The nut has been removed from the stuffing box. The unloading apparatus is in its relaxed configuration, and has been positioned adjacent the first end of the stuffing box.

FIG. 9 shows the stuffing box and unloading apparatus of FIG. 8 at a later stage of the unloading process. The unloading apparatus has been partially inserted into the stuffing box through the aligned openings of the packing elements. The unloading apparatus has assumed its compressed configuration.

DETAILED DESCRIPTION

Figure 2:
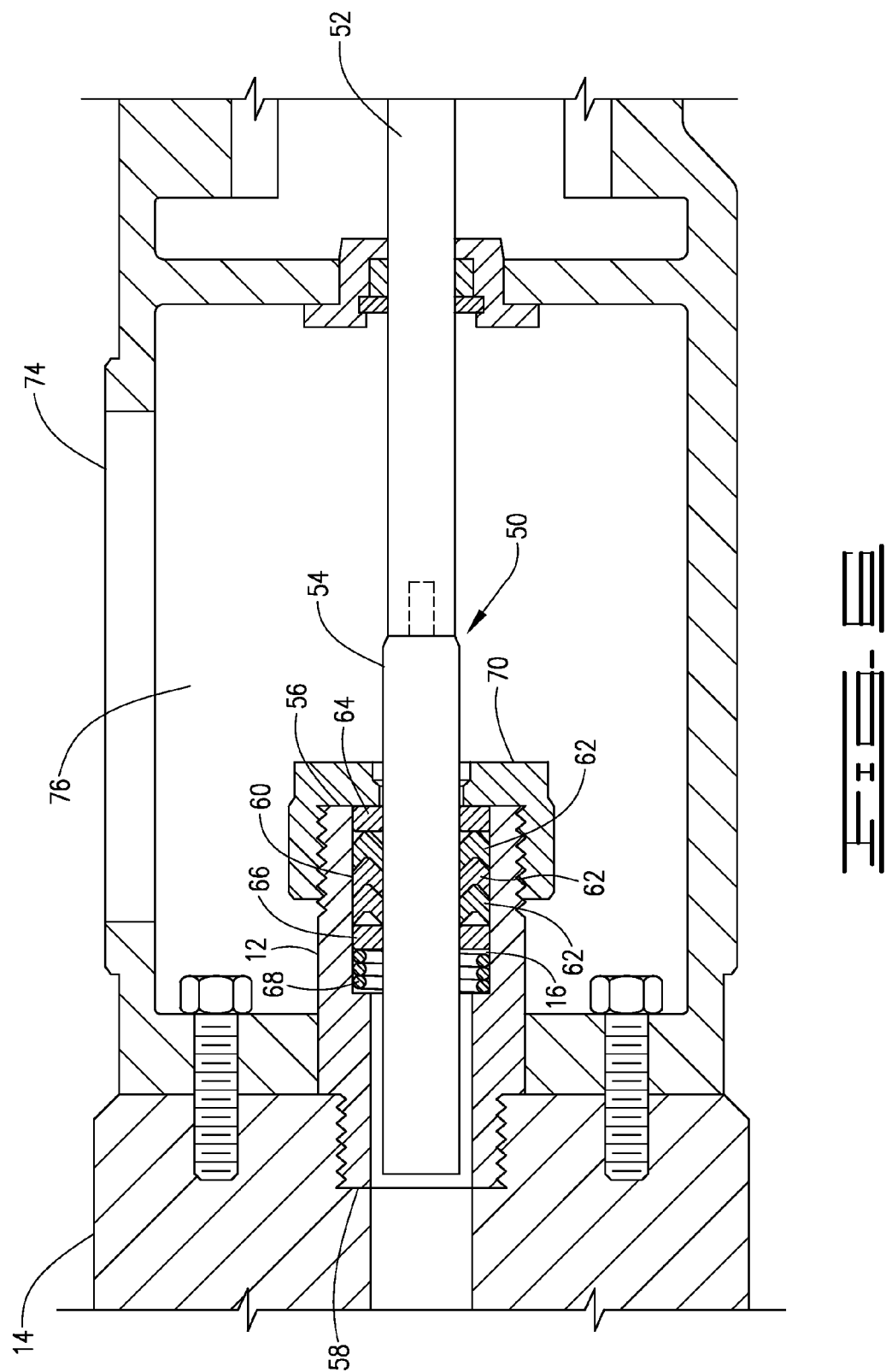
FIG. 2 is a top plan view of the unloading apparatus shown in FIG. 1. The apparatus is in a relaxed configuration.

FIGS. 1-5 show a apparatus 10 that may be used to unload a stuffing box having an internal chamber. A stuffing box 12 suitable for use with the apparatus 10 is shown in FIGS. 6-11. The stuffing box 12 is preferably part of a pump 14, and features an internal chamber 16.

As shown in FIG. 1, the apparatus 10 is characterized by a first end 18 and an opposed second end 20. It includes a base 22 that is situated at or adjacent the first end 20 of the apparatus and is symmetric about a longitudinal axis 24. Preferably, the base 22 is characterized by a circular cross section and outer surfaces 26 that define a cylindrical shape.

The apparatus 10 further comprises a plurality of elongate finger elements 28. The finger elements 28 are spaced apart from one another and are supported by and joined to the base 22. Preferably, the finger elements are joined to the base 22 about its periphery.

The finger elements 28 define outer boundaries of a hollow interior region 30 that is coaxial with the base 22. In the embodiment shown in the Figures, the apparatus 10 includes four finger elements 28. An elongate slot 32 is formed between each adjacent pair of finger elements 28.

Preferably the external shape and dimensions of each finger element 28 conform to the external shape and dimensions of that portion of the base 22 that is offset axially from that finger element 28. The outer surface 34 of each finger element 28 thus joins smoothly with the outer surface 26 of the base 22. When the outer surface 26 defines a cylindrical shape, the outer surface 34 of each finger element 28 forms a curved shape with the same radius and axis as the outer surface 26 of the base 22.

At or adjacent the second end 20 of the apparatus, the extremity of each finger element 28 supports an externally projecting lip 36 having a free end 38. As shown in FIG. 5, each lip 36 is characterized by an outward-extending first surface 40. The first surface 40 is planar, and disposed in orthogonal relationship to the outer surface 34 of the supporting finger element 28. Joining the first surface 40 at free end 38 is a convexly-shaped second surface 42, which may be smooth and curved. The second surface 42 of the lip 36 is situated at an axial extremity of the apparatus 10, and functions to guide the finger element 28 toward axis 24, as the apparatus 10 is pushed axially against a surface.

The apparatus 10 should be formed from a strong and durable material that is both deformable and sufficiently resilient that it can fully recover its shape after deformation. A preferred material is spring or tool steel that has been tempered. Preferably, the apparatus 10 is formed from a single piece or unit of material.

In a preferred embodiment, the apparatus 10 is formed from a single solid bar of steel that is machined to the required shape. Webs that interconnect adjoining finger elements 28 at the second end 20 are left in place. The machined shape is then subjected to heat treatment to increase its hardness. Following heat treatment, the connecting webs are cut away to form the finished apparatus 10.

Figure 3:
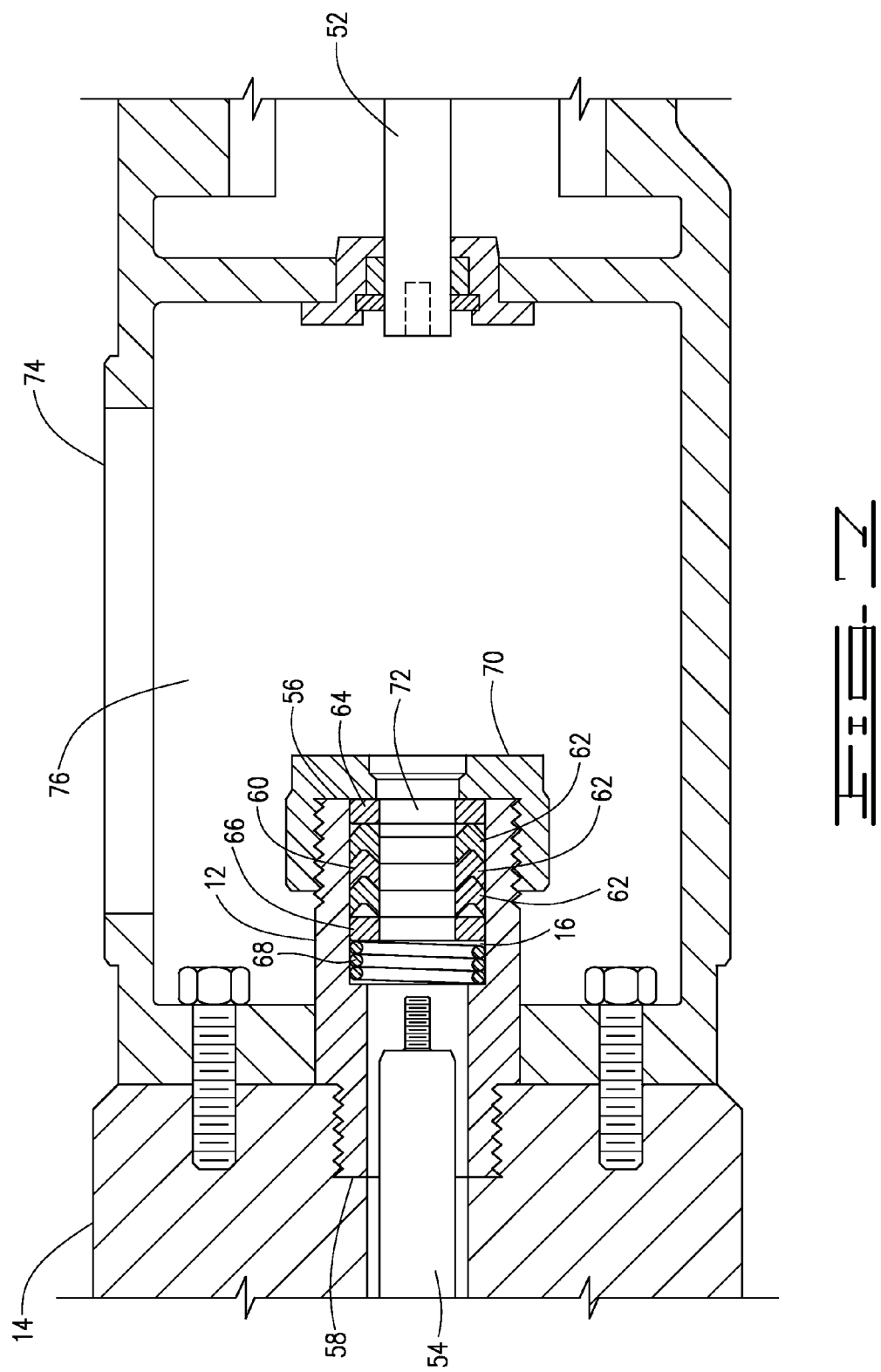
FIG. 3 is a bottom plan view of the unloading apparatus shown in FIG. 1. The apparatus is in a relaxed configuration.

The apparatus 10 is characterized by a relaxed configuration and a compressed configuration. The relaxed configuration is shown in FIGS. 1, 2 and 3. In this configuration, the lips 36 at least partially project outside the cross-sectional profile 44 of the base 22, as shown in FIG. 3.

Figure 4:
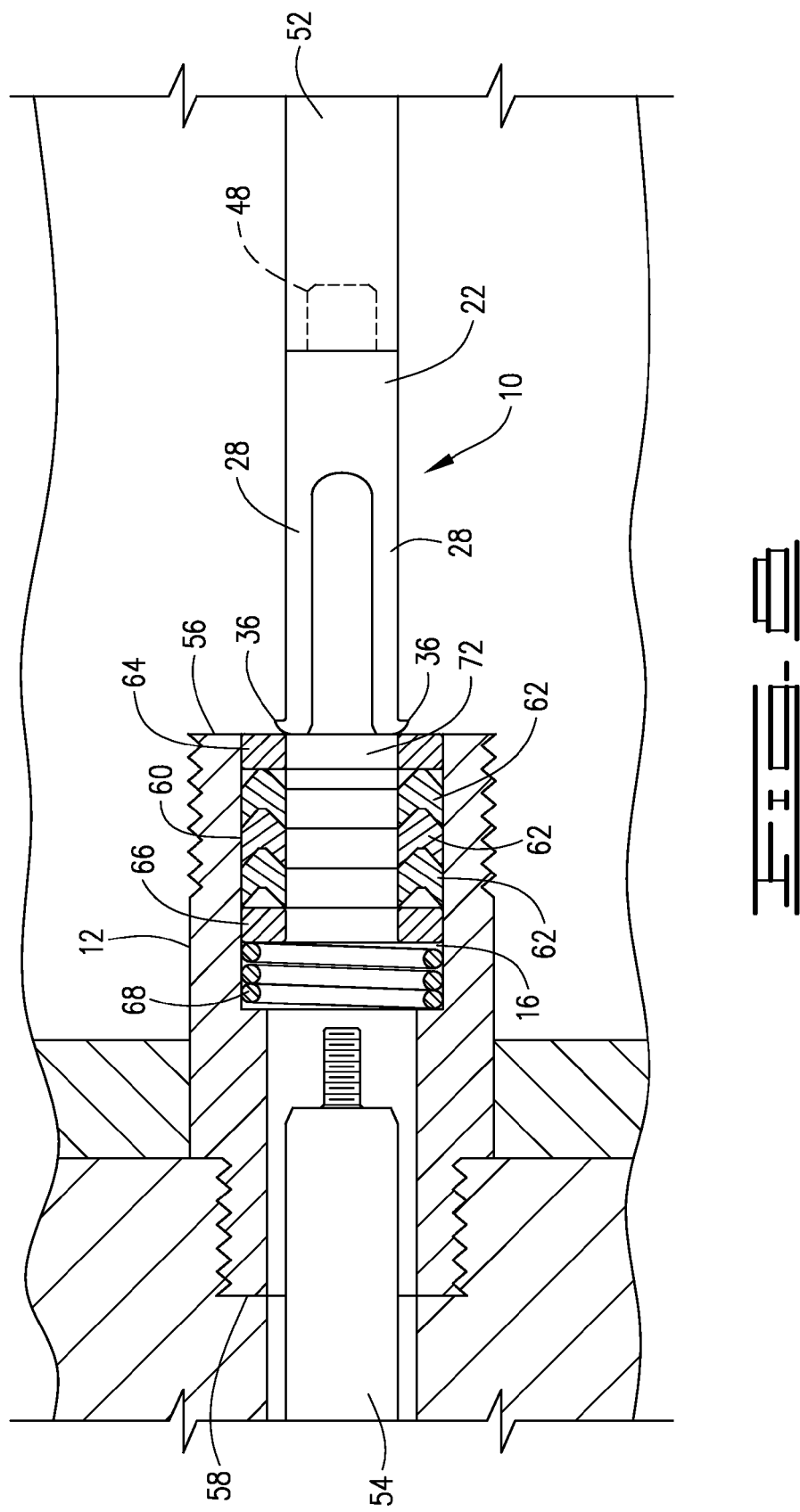
FIG. 4 is a bottom plan view of the unloading apparatus shown in FIG. 1. The apparatus is in a fully compressed figuration, such that the lips of the finger elements are not visible.

The compressed configuration is achieved when the lips 36 are fully contained within the cross-sectional profile 44 of the base, as shown in FIG. 4. To achieve this compressed configuration, a deforming forced is applied to the apparatus 10. Preferably, this deforming force is a laterally compressive force.

The deforming force causes the lips 36 and finger elements 28 to move toward the axis 24. Because interior region 30 is hollow, the apparatus 20 provides sufficient space for this internal movement. When the deforming force is removed or relaxed sufficiently, the apparatus 10 returns to its relaxed configuration.

The base 22 should feature a planar surface 46 at its lower extremity. Surface 46 is disposed in orthogonal relationship to the axis 24. An axially disposed threaded shaft 48 may be installed in the base 22, such that it projects at one end from surface 46.

One embodiment of the apparatus 10 is used to unload annular packing elements having central openings with a diameter of 0.875 inches. In this embodiment, the maximum end-to-end length of the apparatus, excluding the projecting threaded shaft, is 3 inches. The diameter of the cylindrical base is 0.865 inches. The maximum width of the apparatus adjacent second end 20 is 1.02 inches.

FIG. 6 shows a portion of a pump 14 with which the apparatus 10 may be used. The pump 14 includes a reciprocating rod assembly 50 formed from a first rod 52, which may comprise a pony rod, and a second rod 54. The first and second rods 52 and 54 are releasably joined in end-to-end relationship, preferably by mating threads.

During normal operation of the pump 14, the second rod 54 extends through and reciprocates within a stuffing box 12 having an open first end 56 and an open second end 58. Typically, the stuffing box 12 is permanently secured to the body of the pump 14.

The stuffing box 12 is loaded with a plurality of coaxially disposed annular packing elements 60. The packing elements include a plurality of contiguous seals 62 disposed in stacked relationship. In the embodiment shown in the Figures, three such seals 62 are provided. The packing elements may further comprise an adapter element 64 and a retainer element 66, situated on opposite sides of the stacked seals 62.

The adapter element 64 is situated immediately adjacent the first end 56 of the stuffing box 12. The packing elements may further comprise a spring 68, situated adjacent the retainer element 66 at the second end 58 of the stuffing box 12.

The stuffing box 12 is releasably closed at its first end 56 by a nut 70, such as a castle nut, which is preferably secured to the stuffing box 12 by mating threads. The packing elements 62 and the nut 70 are characterized by central axial openings 72, preferably circular, that permit the second rod 54 to extend closely, but clearingly, therethrough.

During operation of the pump 14, reciprocation of the rod assembly 50 causes the seals 62 to wear. In order to keep the pump 14 operating efficiently, these seals 62 must be removed and replaced periodically. A port 74 formed in a wall of the pump 14 provides access to the service area 76 around stuffing box 12 for this removal and replacement operation.

Because the seals 62 are tightly packed within the stuffing box 12, their removal can be difficult. Removal is further complicated by the limited space available in the area around the stuffing box 12, as shown in FIG. 6. As a result, manual and tool access to the stuffing box is highly restricted.

When conventional hand tools are used to remove seals, those tools can easily scratch or otherwise damage the inner surfaces of the stuffing box 12, producing damage that can impair sealing and interfere with efficient pump operation. Moreover, in some instances, removal must be performed under challenging outdoor field conditions. All of these factors can make seal removal a difficult process that can easily result in damage to the stuffing box.

FIGS. 6-11 show how the unloading apparatus 10 can be used to remove packing elements with greater speed and accuracy, and less risk of damage to the stuffing box. During the initial stage of replacement, shown in FIG. 7, the first and second rods 52 and 54 of the rod assembly 52 are disconnected. The pump mechanism is used to pull second rod 54 out of the stacked packing elements 60. Similarly, the first rod 52 is drawn away from the stuffing box 12.

In the next stage of replacement, shown in FIG. 12, the nut 70 is unthreaded from the stuffing box 12. The unloading apparatus 10, in its relaxed configuration, is then coaxially aligned with the aligned central openings 72 of the packing elements 70 within the stuffing box 12. Preferably this aligned positioning is achieved by releasably connecting the apparatus 10 to first rod 52 and maintaining them in coaxial engagement. That coaxial engagement is maintained by mating the threaded shaft 48 supported on base 22 with internal threads formed within the end of first rod 52.

Axial force is next applied to the apparatus 10 in the direction of the stuffing box 12, preferably at the planar surface 46 of base 22. Preferably, such axial force is applied by manually pushing the apparatus 10 toward the stuffing box 12. The coaxial engagement of apparatus 10 with first rod 52 assures that apparatus 10 enters the stuffing box 12 in an axial direction.

The convex second surface 42 of each lip 36 contacts the uppermost packing element 60 at the edge of its central opening 72. In the embodiment shown in the Figures, the uppermost packing element is adapter element 64. Under axial force, the second surface 42 guides each lip 36, and its attached finger element 28, into the central opening 72 of the adapter element 64.

As axial force continues to be applied, the apparatus 10 moves axially within the stuffing box 12, through aligned central openings 72 of the stacked packing elements 60. The lips 36 and finger elements 28 are compressed by the packing elements 60, causing the lips 36 and finger elements 28 to move toward axis 24 and occupy a portion of the previously hollow interior region 30. This causes the apparatus 10 to assume its compressed configuration, as shown in FIG. 9.

The external dimensions of the base 22 closely but clearingly match those of the central openings 72 of the packing elements 60. Thus, in its compressed configuration, the apparatus 10 can be moved through the aligned openings 72 of the packing elements 60.

Figure 10:
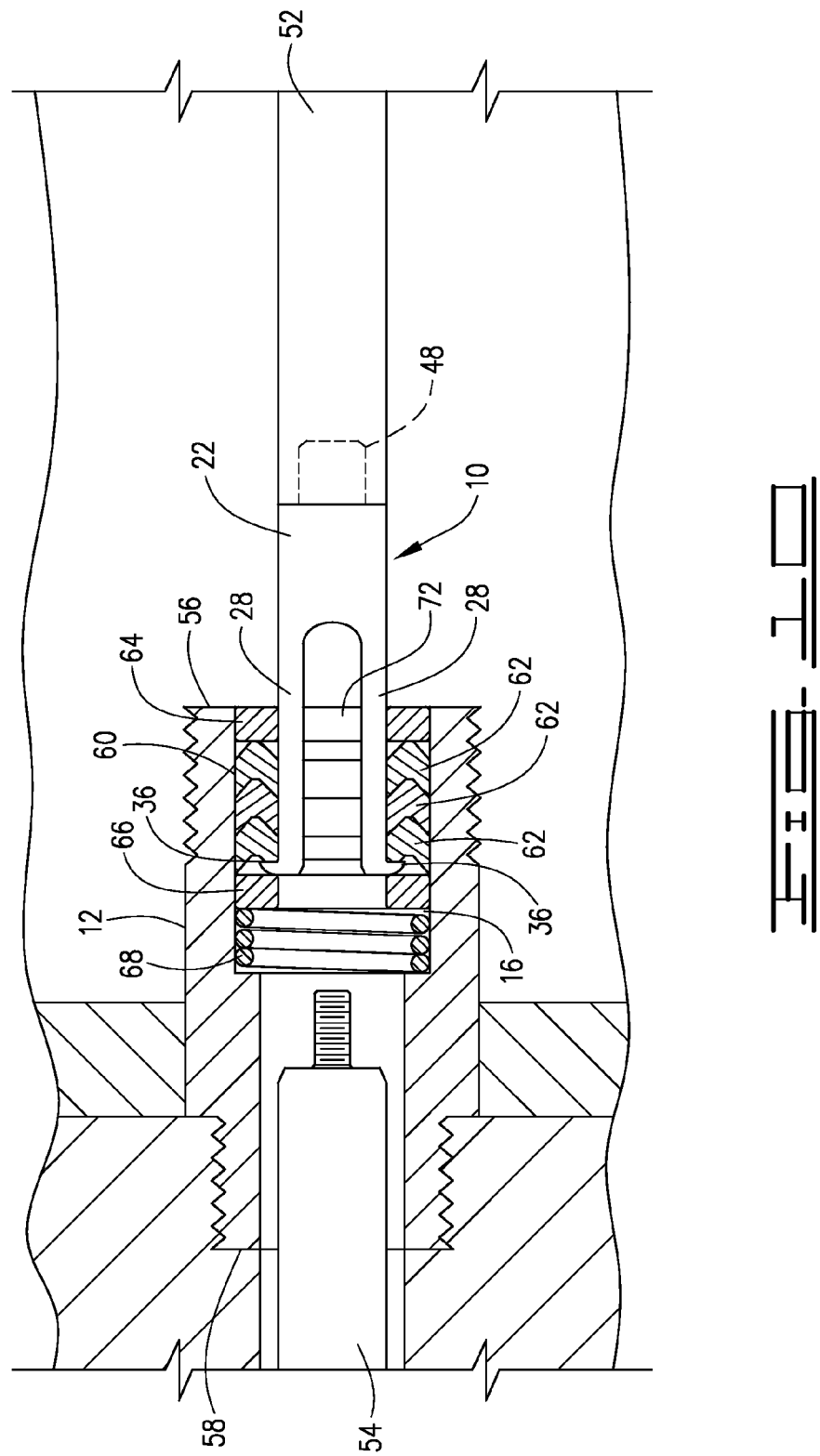
FIG. 10 shows the stuffing box and unloading apparatus of FIG. 9 at a later stage of the unloading process. The unloading apparatus has been further inserted into the stuffing box, and has returned to its relaxed configuration, with the lips engaging the underside of the lowermost packing element.
Figure 11:
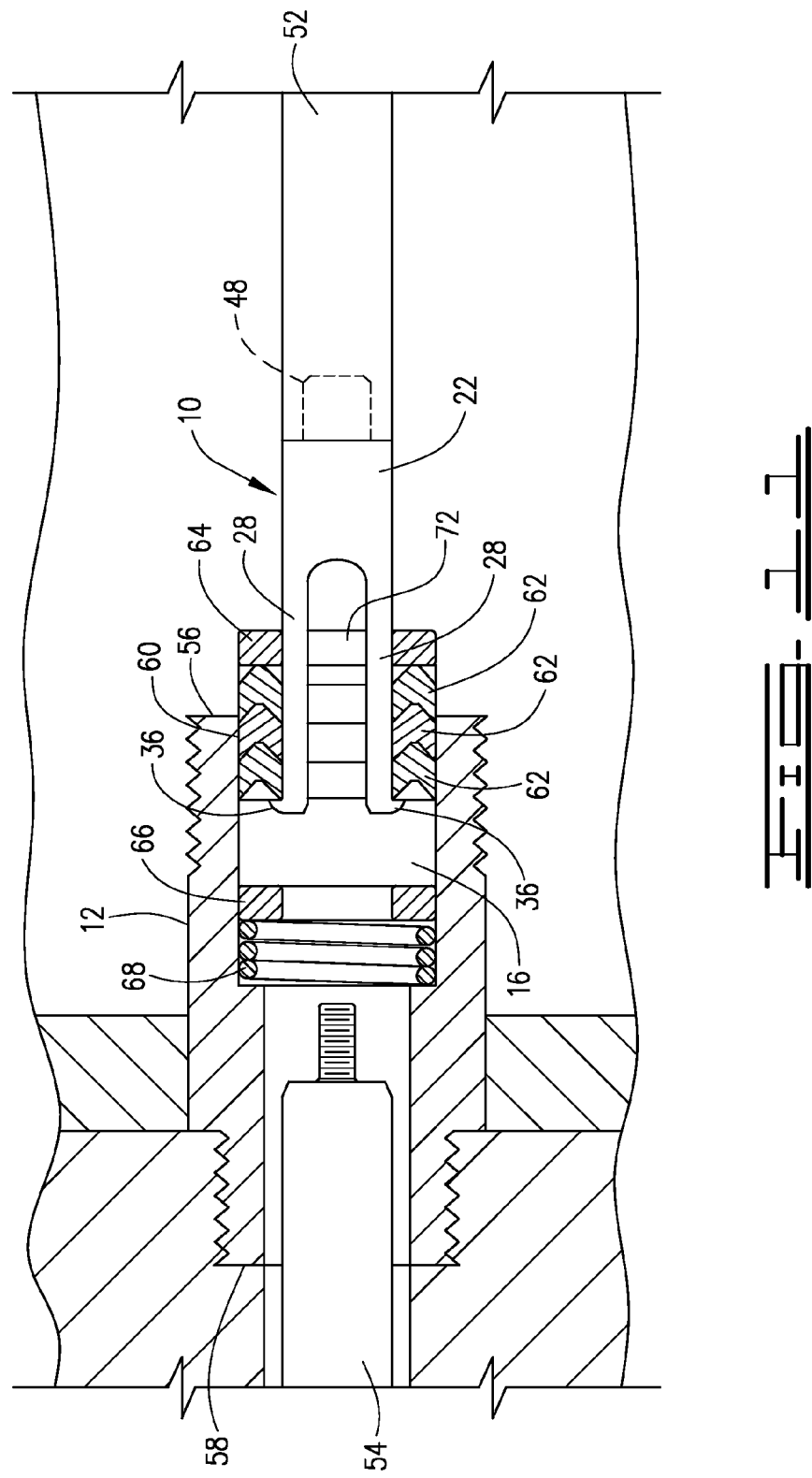

As shown in FIG. 10, the apparatus 10 is preferably sized so that, at its point of maximal insertion into the stuffing box 12, the lips 36 can closely but clearingly underlay the lowermost of those packing elements 60 that are to be removed from the stuffing box 12. In the embodiment shown in the Figures, the lowermost packing element to be removed is the lowermost seal 62. The retainer element 66 and spring 68 are not customarily removed when packing elements are replaced.

When the lips 36 of the apparatus 10 clear the lowermost of the seals 62, the resiliently deformable construction of the apparatus 10 causes the finger elements 28 and lips 36 to return the apparatus to its relaxed configuration, as shown in FIG. 10. In that configuration, the planar first surfaces 40 of the lips 36 engage the underside of the lowermost seal 62. At this stage, axial insertion of the apparatus 10 into the stuffing box 12 is stopped.

Figure 11:
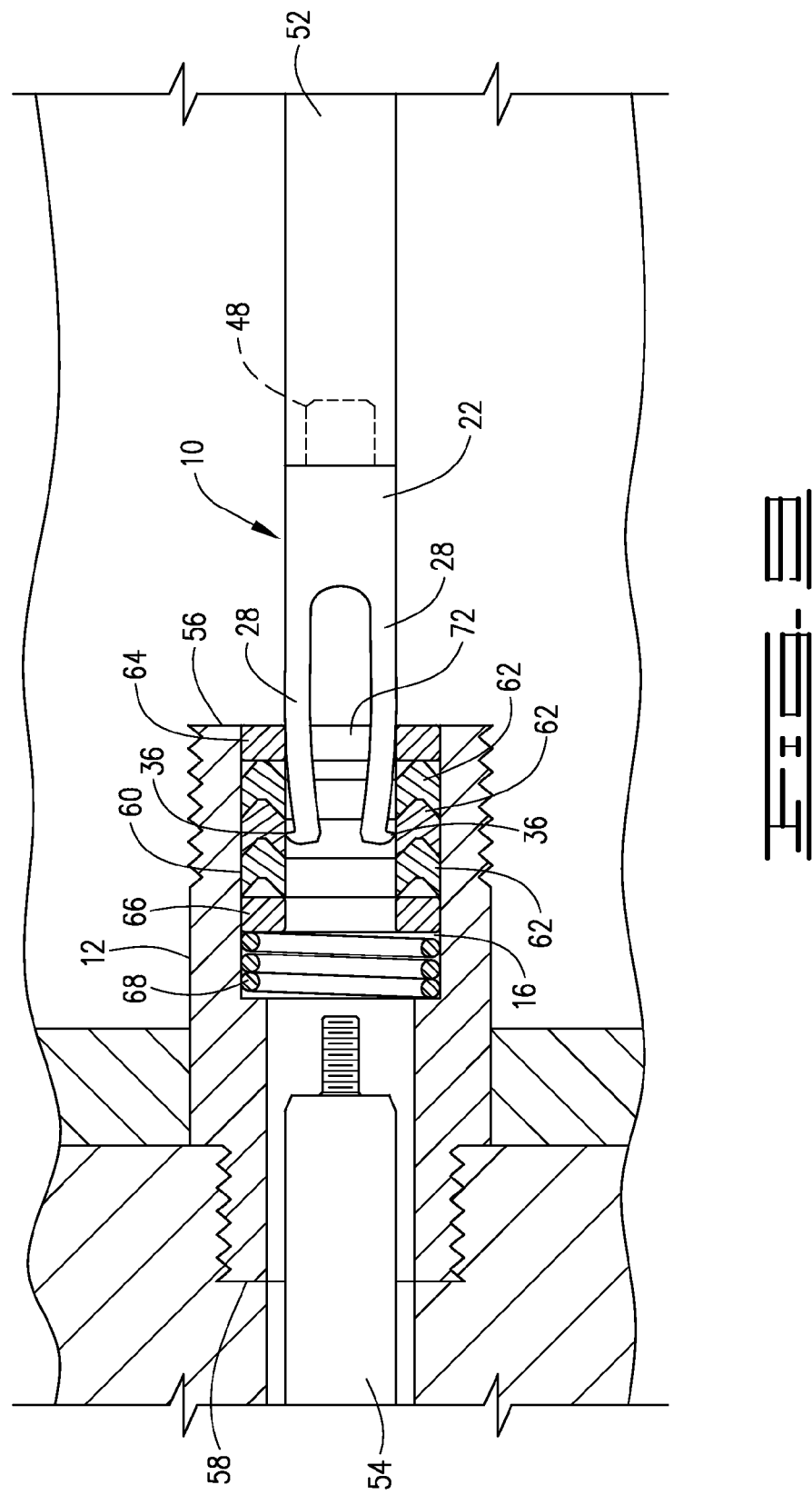
FIG. 11 shows the stuffing box and unloading apparatus of FIG. 10 at a later stage of the unloading process. The unloading apparatus, still in its relaxed configuration, is being withdrawn from the stuffing box. The packing elements above the lips are carried with the apparatus as it is withdrawn.

Axial force in the opposite direction is next applied to the apparatus 10. Preferably, such axial force is applied by manually pulling the apparatus 10 from the stuffing box 12. As shown in FIG. 11, this axial force causes the apparatus 10, still in its relaxed configuration, to be withdrawn from the stuffing box 12. The lowermost packing element 60 engaged by the lips 36, and any packing elements 60 above it, are carried out of the stuffing box 12 as the apparatus 10 is withdrawn. Inasmuch as the apparatus 10 is inserted and withdrawn from the stuffing box 12 through application of purely axial forces, the internal sides of the stuffing box 12 are not scratched or otherwise damaged during the removal process.

Following removal of the apparatus 10 from the stuffing box 12, the apparatus 10 is disengaged from the first rod 52, and any used packing elements 60 are removed. Following replacement of the removed packing elements 60 with new packing elements, the first rod 52 and second rod 54 are reconnected. The reassembled pump 14 is now ready for use.

Changes may be made in the construction, operation and arrangement of the various parts, elements, steps and procedures described herein without departing from the spirit and scope of the invention as described in the following claims.

The invention claimed is:

1. An apparatus for unloading a stuffing box, the apparatus having a first end and an opposed second end, comprising:
    a cylindrical base situated at or adjacent the first end of the apparatus and having a periphery; and
    a plurality of elongate finger elements supported by the base and disposed about the periphery of the base, each finger element characterized by a curved outer surface having the same axis and radius as the base and supporting an externally projecting lip that tapers toward and includes the second end, the finger elements defining outer boundaries of a hollow interior region.

2. The apparatus of claim 1 characterized as having a relaxed configuration in which the lips project outside the cross-sectional profile of the base.

3. The apparatus of claim 1 characterized as having a compressed configuration in which the lips are fully contained within the cross-sectional profile of the base.

4. The apparatus of claim 3 characterized as having a relaxed configuration in which the lips project outside the cross-sectional profile of the base.

5. The apparatus of claim 1 in which an elongate slot is formed between each adjacent pair of finger elements.

6. The apparatus of claim 1 in which the finger elements and lips are formed from a resiliently deformable material.

7. The apparatus of claim 1 in which the external shape of each finger element conforms to the external shape of that portion of the base that is offset axially from that finger element.

8. An assembly comprising:
    the apparatus of claim 1; and
    a stuffing box within which the apparatus has been received.

9. The assembly of claim 8, further comprising:
    a pump, of which the stuffing box is a component.

10. The assembly of claim 8, further comprising:
    a least one packing element installed within the stuffing box, the packing element having a central opening through which the apparatus has been received.

11. The assembly of claim 10 in which the lips of the apparatus engage the underside of the packing element.

12. The assembly of claim 10 in which the external dimensions of the base closely but clearingly match those of the central opening of the packing element.

13. The apparatus of claim 1 having four of the said finger elements.

14. An assembly comprising:
    a pump having a stuffing box; and
    an apparatus for unloading a stuffing box, the apparatus having a first end and an opposed second end, comprising:
        a base situated at or adjacent the first end of the apparatus and having a periphery; and
        a plurality of elongate finger elements supported by the base and disposed about the periphery of the base, each finger element supporting an externally projecting lip at or adjacent the second end, the finger elements defining outer boundaries of a hollow interior region;
    in which the apparatus for unloading a stuffing box has been received within the stuffing box.

15. An assembly comprising:
    a stuffing box; and
    an apparatus for unloading a stuffing box, the apparatus having a first end and an opposed second end, comprising:
        a base situated at or adjacent the first end of the apparatus and having a periphery; and
        a plurality of elongate finger elements supported by the base and disposed about the periphery of the base, each finger element supporting an externally projecting lip at or adjacent the second end, the finger elements defining outer boundaries of a hollow interior region;
    in which the apparatus for unloading a stuffing box has been received within the stuffing box, and in which at least one packing element has been installed within the stuffing box, the packing element having a central opening through which the apparatus has been received.

16. The assembly of claim 15 in which the lips of the apparatus engage the underside of the packing element.

17. The assembly of claim 15 in which the external dimensions of the base closely but clearingly match those of the central opening of the packing element.

* * * * *